(12) United States Patent
Bohn et al.

(10) Patent No.: US 6,856,724 B2
(45) Date of Patent: Feb. 15, 2005

(54) COMPENSATION SYSTEM FOR ADAPTIVE EQUALIZATION OF AN OPTICAL SIGNAL

(75) Inventors: Marc Bohn, Munich (DE); Georg Mohs, Milltown, NJ (US); Sven Otte, Kiel (DE); Christian Scheerer, Ottawa (CA); Christoph Glingener, Feldkirchen-Westerham (DE); Jan Mietzner, Mielkendorf (DE); Werner Rosenkranz, Laboe (DE)

(73) Assignee: Siemens Aktiengesellschaft, Munich (DE)

( * ) Notice: Subject to any disclaimer, the term of this patent is extended or adjusted under 35 U.S.C. 154(b) by 288 days.

(21) Appl. No.: 10/254,420

(22) Filed: Sep. 25, 2002

(65) Prior Publication Data

US 2003/0103723 A1 Jun. 5, 2003

(30) Foreign Application Priority Data

Sep. 25, 2001 (DE) ........................................ 101 47 162
Sep. 25, 2001 (DE) ........................................ 101 47 063
Sep. 25, 2001 (DE) ........................................ 101 47 161

(51) Int. Cl.[7] ............................ G02B 6/26; H04J 14/02; H04B 10/18
(52) U.S. Cl. ........................... 385/27; 398/81; 398/149; 385/39
(58) Field of Search ....................... 385/27, 39; 398/81, 398/149

(56) References Cited

U.S. PATENT DOCUMENTS 5,859,939 A * 1/1999 Fee et al. ..................... 385/24
5,930,414 A 7/1999 Fishman et al.

FOREIGN PATENT DOCUMENTS

| EP | 0 700 178 | 3/1996 |
| EP | 0 740 173 | 10/1996 |
| WO | WO 00/50944 | 8/2000 |
| WO | WO 01/61889 | 8/2001 |

OTHER PUBLICATIONS

Bulow et al., "Adaptive PMD Mitigation at 10 Gbit/s using an Electronic SiGe Equalizer IC", pp. 138–139.

Merker et al., "Comparison of PMD–compensation techniques at 10 Gbit/s using an optical first order compensator and electrical transversal filter", pp. 135–141.

* cited by examiner

*Primary Examiner*—Frank G. Font
*Assistant Examiner*—Michael P. Mooney
(74) *Attorney, Agent, or Firm*—Bell Boyd & Lloyd LLC (57) ABSTRACT

A compensation system for adaptive equalization of an optical signal, wherein an optical filter, whose complex coefficients are adjustable, is used for signal equalization. The quality of the optical signal is used, after conversion to an electrical data signal, as a control criterion. The compensation device can largely compensate for distortion produced by dispersion, polarization mode dispersion or self phase modulation. An optical compensation filter with a wide free spectral range is used to compensate for the wavelength-dependent dispersion in a wavelength-division multiplexed system. The setting of the filter may be fixed, or may be adjusted adaptively in a closed control loop.

17 Claims, 7 Drawing Sheets

COMPENSATION SYSTEM FOR ADAPTIVE EQUALIZATION OF AN OPTICAL SIGNAL

BACKGROUND OF THE INVENTION

When optical signals (pulses) are transmitted via an optical fiber, they are distorted. This distortion reduces the signal quality and considerably restricts the range without regeneration, especially at high bit rates. Wavelength-dependent attenuation can be compensated for via suitable amplifiers. Suitable measures are used in an attempt to compensate for other effects such as group delay time dispersion, polarization mode dispersion (PMD) and self phase modulation (SPM).

A method for PMD compensation via an optical first-order compensator and by via an adjustable electrical transversal filter are compared in "Optics Communications", Volume 182, No. 1–3, pages 135–141.

Until now, compensation for group delay time dispersion, which is referred to as dispersion for short in the following text, mainly has been carried out by using special fibers whose group delay time characteristics are the inverse of those of the transmission fibers.

An adjustable electrical transversal filter which is used to compensate for PMD and dispersion is described in "ECOC'99" Vol. 2, pp. 138–139, H. Bühlow et al.

The International Patent Application WO 00/50944 discloses an arrangement for dispersion compensation in which a Bragg grating filter is controlled as a function of the dispersion. By way of example, a dispersion analyzer assesses the eye opening or the bit error rate. The determined signal quality is used as a closed-loop control criterion. The arrangement likewise can be used for PMD compensation.

European Patent Application EP 0 740 173 A2 discloses the use of an optical transversal filter for dispersion compensation in individual channels, or for all channels at the same time, in a wavelength-division multiplexed system. This reduces the complexity in comparison to separate filters or compensation arrangements for individual channels. Compensation via a periodic filter has the same compensation effect for all channels but is not optimum in the presence of wavelength-dependent dispersion (higher-order dispersion), in which the gradient of the dispersion profile changes.

Furthermore, it is known, per se, for dispersion fundamental compensation to be carried out via an appropriate fiber, and for this to be combined with fine compensation using electrical filters.

An object of the invention is to derive an arrangement for adaptive signal equalization.

SUMMARY OF THE INVENTION

The advantage of the present invention is the capability of the optical filter to adapt itself to distortion which has been caused by dispersion, PMD or SPM. Compensation in the optical domain leads to better results than compensation in the electrical domain, since the equalization process is carried out before optoelectrical conversion. The photodiode used as an electrooptical converter is a nonlinear element with a square-law characteristic, which emits an envelope of the transmitted amplitude-modulated signal as a demodulated signal. The carrier and any phase information are lost during the conversion to an electrical signal.

In order to allow satisfactory compensation to be carried out, it is necessary to set an optimum complex transfer function for the compensation filter. As such, complex coefficients are set in a transversal filter. Although, in principle, both FIR filters (finite impulse response) and IIR filters (infinite impulse response) or a combination of both filter types can be used, transversal filters are, however, preferable since they can be adjusted well, possibly in combination with a recursive filter type.

In principle, all types of distortion can be compensated for, irrespective of their cause. A distinction is drawn between adaptive compensation and compensation via an inverse system. With an adaptive approach, optimum equalization is carried out without simulating the inverse system as a transfer function.

In an inverse system, the aim is to form the inverse transfer function. Initially, this is set such that it is fixed, but it also may include an adaptive component.

Dispersion compensation allows fundamental compensation to be carried out via a dispersion-compensating fiber (DCF) or a further (adjustable) compensation filter, thus reducing the required adjustment range of the filter.

A number of adaptive compensation devices also may be connected in series; for example, dispersion compensation for a transmission band having a number of wavelength-division multiplexed channels, and a channel-specific PMD compensation arrangement. The signal quality, such as the eye opening or bit error rate, or the spectrum is preferably assessed for open-loop compensation control, and the compensation is optimized by varying the coefficients.

Compensation likewise can be carried out using optical or electrical filters.

The particular advantage of dispersion compensation is the individual configuration of the dispersion profile, which is the inverse of that of the transmission fiber, of the optical compensation filter. The period (free spectral range—FSR) of the filter covers a number of transmission channels, and preferably all the channels of a wavelength-division multiplexed signal, so that all the WDM channels, or even an entire transmission band, preferably can be compensated for using only one filter.

In an extended embodiment, the filter is adjusted adaptively, with characteristic transmission channels, or all the transmission channels, supplying quality criteria. This makes it possible to react to a change in the system parameters.

The optical filters which are normally used these days frequently have an unsatisfactory transfer function; in particular a nonideal phase response. This can be equalized by using a correction filter. The filter characteristics that are desired overall, such as a specific frequency response or a wide adjustment range of the passband or cut-off frequency, cannot be provided solely by the desired correction filter (filter function). An ideal component can be created by combining the nonideal component, such as a Bragg grating, with an optical correction filter for equalization.

Additional features and advantages of the present invention are described in, and will be apparent from, the following Detailed Description of the Invention and the Figures.

DETAILED DESCRIPTION OF THE INVENTION

Figure 1:
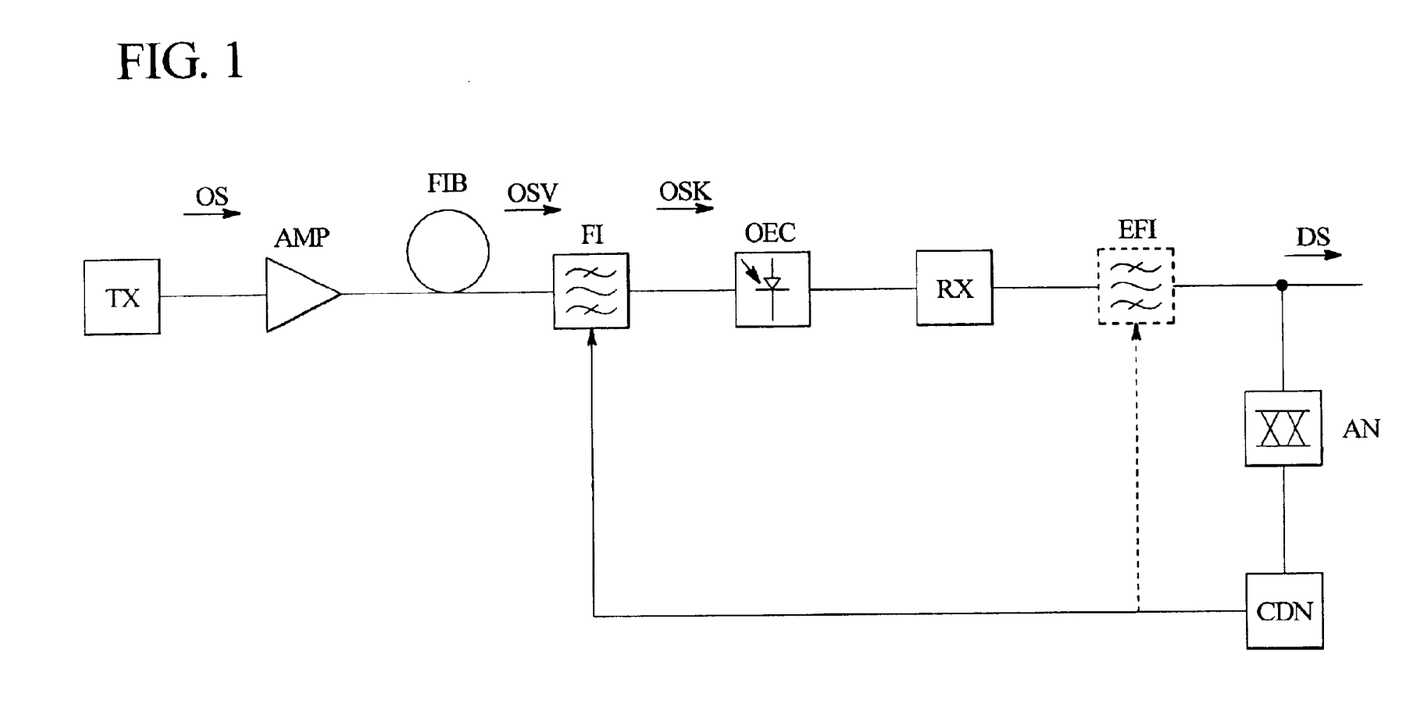
FIG. 1 shows an outline circuit diagram of the compensation system.

FIG. 1 illustrates the principle of a transmission system with the compensation system FT, OEC, RX, AN, CON according to the present invention. A transmitter TX emits an optical signal OS which is modulated with a binary signal, is amplified in an amplifier AMP, and is transmitted via an optical fiber FIB. Further amplifiers and dispersion compensation devices, generally dispersion-compensating fibers, can be inserted on the transmission path. The optical signal OSV, which has been distorted by dispersion and nonlinear effects, is supplied to a closed-loop control device, which essentially includes an optical compensation filter FI, an analyzer AN and an open-loop control device CON. Since the analyzer and the open-loop control device operate electrically, conversion via an optoelectrical converter OEC is required prior to this. The receiver RX which is connected downstream from this amplifies the electrical signal linearly and, at its output, emits the data signal DS, which has not yet been limited or sampled. An analyzer AN which is connected to the output of the receiver, or via a splitter to the output of the compensation filter and to a further optoelectrical converter, assesses the quality of the data signal. This may be done by assessing the eye opening, the bit error rate or the spectrum. A closed-loop control signal QS which is derived from the quality criterion is supplied to the open-loop control device CON. This uses an optimization algorithm to change the complex coefficients of the compensation filter FI until a quality maximum is reached.

The compensation and pulse forming can be further improved via an electrical filter EFI, which is connected downstream from the optical filter and is either fixed or adaptively adjustable.

Figure 2:
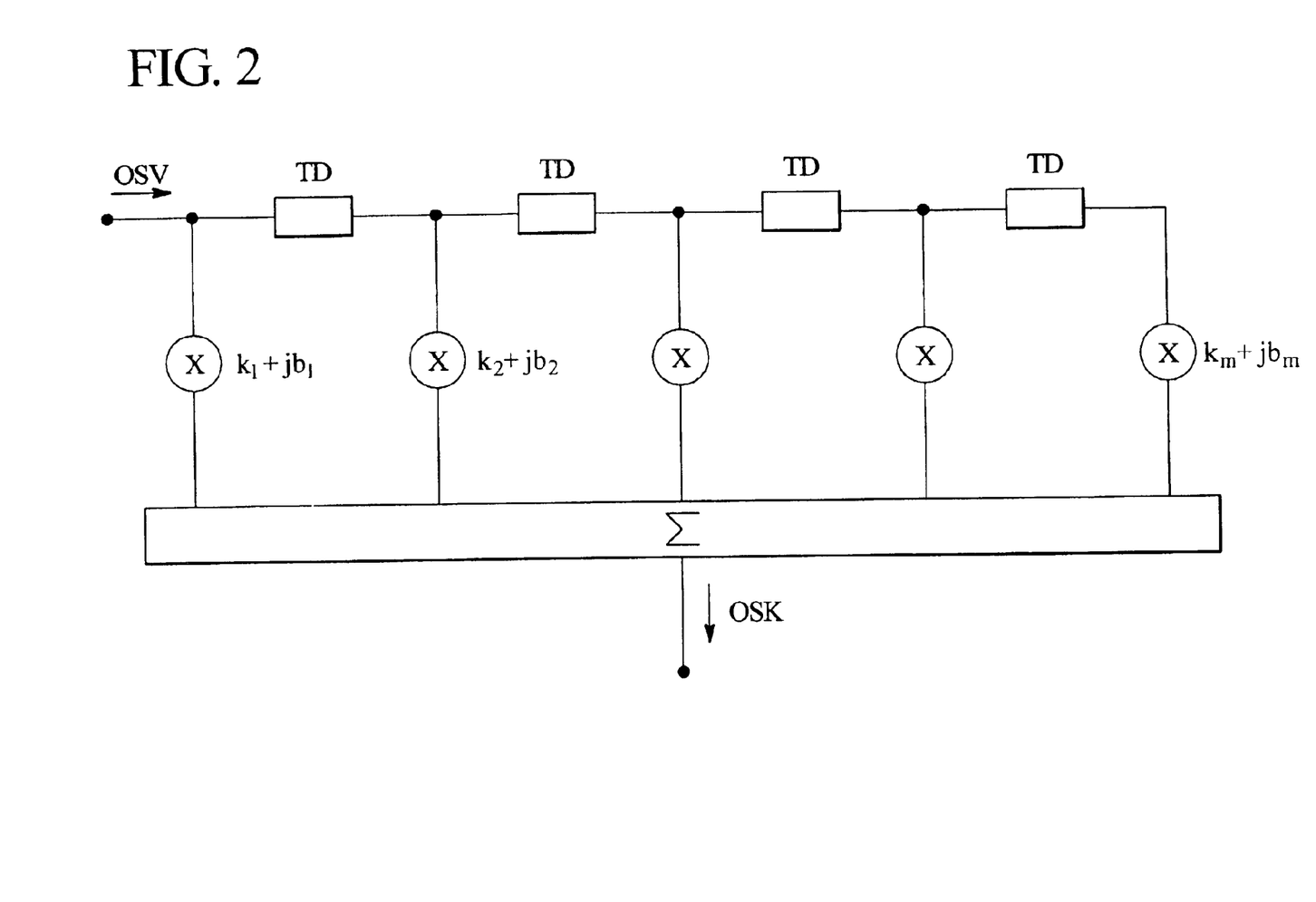
FIG. 2 shows an outline circuit diagram of a transversal filter.

An optical transversal filter (FIR—finite impulse response) whose basic design is illustrated in FIG. 2, contains delay time elements TD, multipliers "x" and at least one adder circuit Σ. The complex coefficients $k_j+jb_j$ to $k_m+jb_m$ of the multipliers can be changed by adjusting the phase (delay time change) and the attenuation in the various branches. The phase can be fine tuned, by way of example, by changing the refractive index of optical elements by heating them. A number of implementation options are known, so that there is no need to describe these here. However, in principle, the filter structure is irrelevant.

Figure 3:
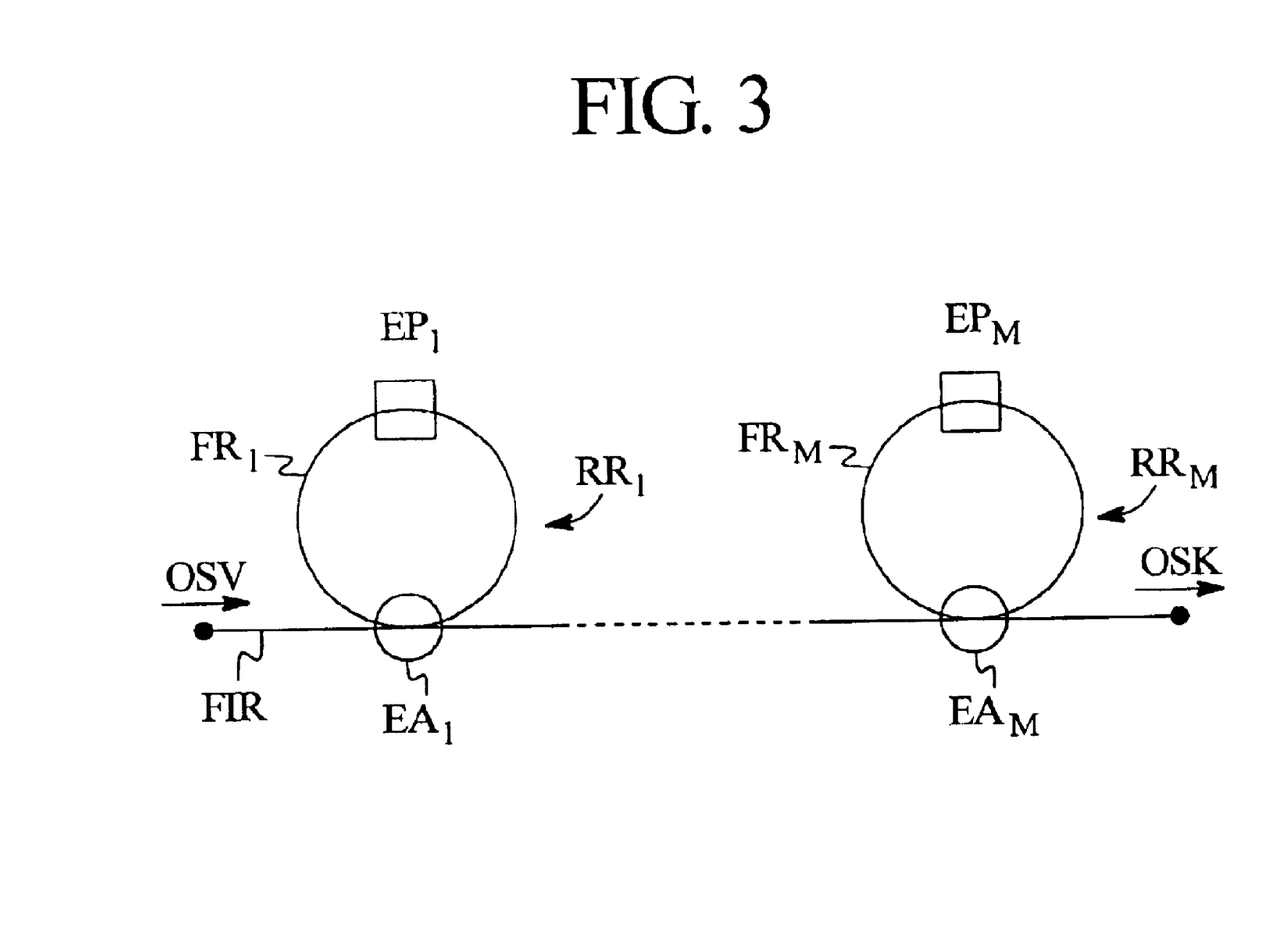
FIG. 3 shows an outline circuit diagram of an IIR filter.

FIG. 3 illustrates a further compensation filter (IIR— infinite impulse response) which is provided by ring resonators $RR_1, \ldots, RR_M$. The ring resonators are coupled to the fiber FIR via first amplitude adjustment elements $EA_1-EA_M$, and the distorted signal OSV is fed into the fiber FIR. These adjustment elements govern the real coefficients, while the delay time, and hence the phase, that is to say the imaginary coefficient, is in each case changed via second phase adjustment elements $EP_1-EP_N$ which are inserted into the fibers $FR_1-FR_M$ of the ring resonators. This system requires fewer coefficients for compensation.

The compensation system always optimizes the data signal irrespective of the cause of the distortion. A system such as this may be used, for example, to compensate for chromatic dispersion or polarization mode dispersion. Self phase modulation also can be compensated for by using an inverse compensation function to compensate for the transmission fiber characteristics which cause the SPM. This is also true for distortion which has a number of causes.

The compensation system may in each case be provided for one transmission channel or, (and this is more economical for WDM systems) have only one filter for a number of channels, or for all the channels, in a transmission band, provided that the periodicity of the filter is chosen such that it corresponds to the channel interval in the WDM system. This system is particularly suitable for fundamental compensation for group delay time dispersion and/or self phase modulation.

Figure 4:
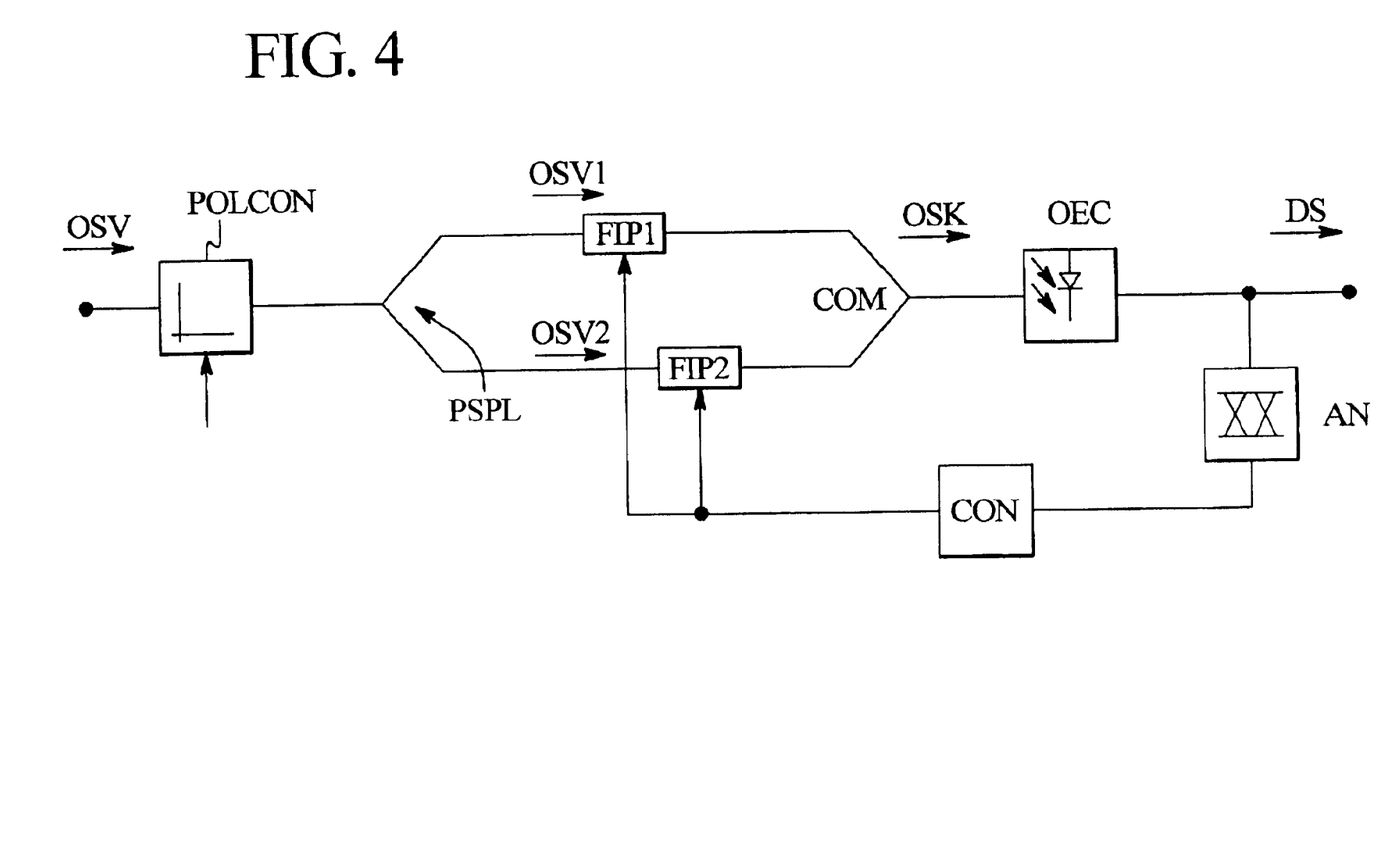
FIG. 4 shows a PMD compensation system.

FIG. 4 illustrates an advantageous system, especially for PMD compensation. The series circuit formed by a polarization controller POLCON and a polarization splitter PSPL is supplied with the distorted optical signal OSV, which is split into two orthogonal signal components (polarization planes) OSV1 and OSV2. The polarization controller uses closed-loop control, which is not illustrated, to ensure stable polarization. The signal components OSV1 and OSV2 are supplied to a respective optical compensation filter FIP1 and FIP2, both of which use closed-loop control. In principle, one of the compensation filters may be replaced by a filter with a fixed setting or by a fixed or controlled delay time element, although this restricts the control capabilities. The signal components OSV1 and OSV2 are equalized, and their delay time differences are compensated for, individually, and they are then combined via a combiner COM to form a compensated signal OSK. After conversion to an electrical data signal DS, the signal quality is checked in the analyzer AN, and the filter coefficients are adjusted by the open-loop control device CON in accordance with the closed-loop control signal QS. Further electrical filters also may be added to the compensation system, for channel-specific equalization of PMD, SPM or wavelength-dependent dispersion.

Figure 5:
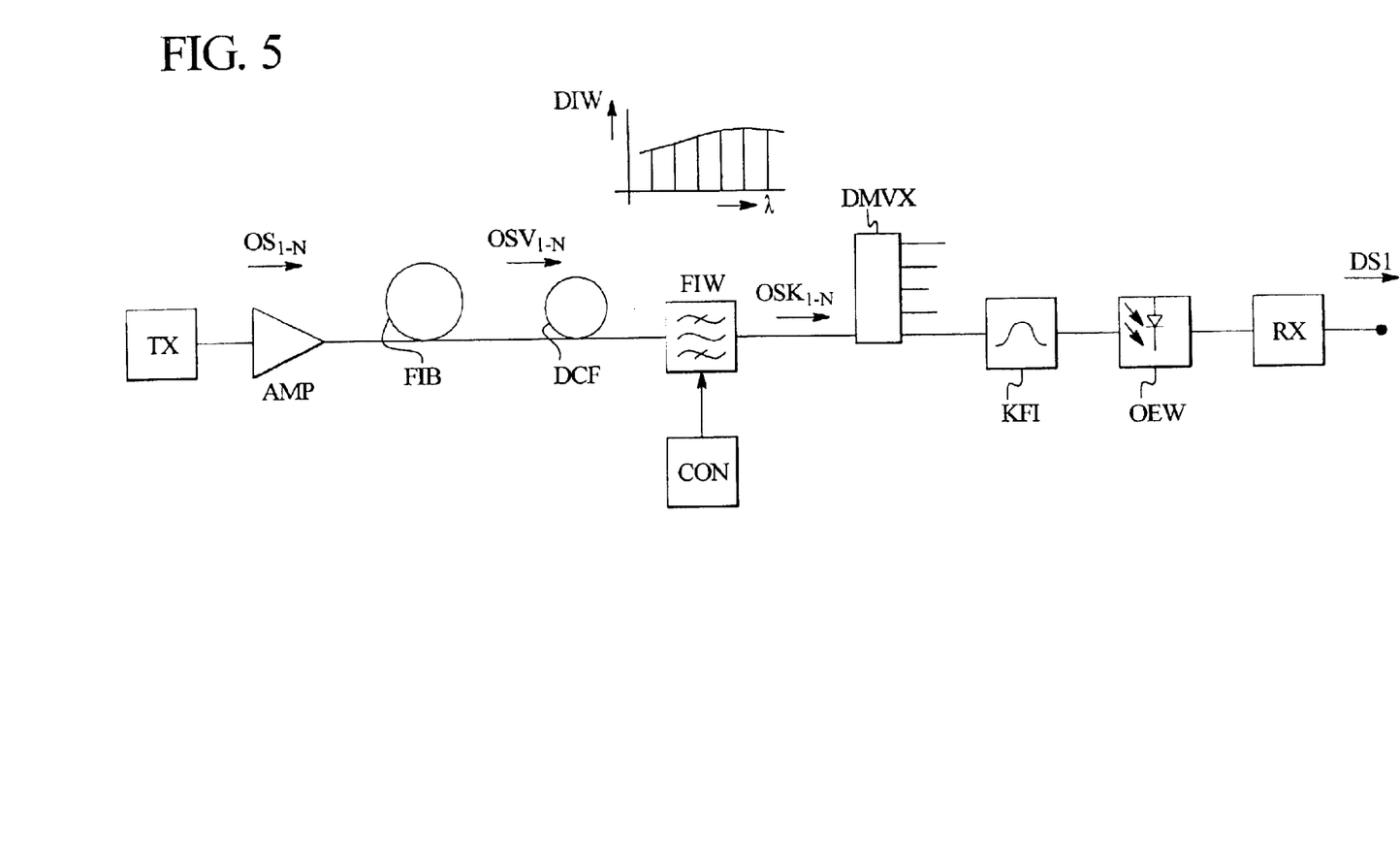
FIG. 5 shows an outline circuit diagram of the system for wavelength-dependent dispersion compensation.

FIG. 5 shows an optical transmission system with channel-specific dispersion compensation. A transmitter TX transmits an optical wavelength-division multiplexed signal $OS_{1-N}$, which is amplified by an amplifier AMP. This signal is transmitted via a transmission fiber FIB, in which a number of amplifiers also may be connected. The nonideal characteristics of the transmission fiber FIB result in a distorted optical signal $OSV_{1-N}$ being produced from the signal $OS_{1-N}$. As is likewise shown above the compensation filter in FIG. 1, the dispersion DIW does not change linearly with the wavelength; that is to say, it has a higher order. The profile of the higher-order nonlinear component is referred to as the wavelength-dependent dispersion component. The dispersion can be largely compensated for via an inversely dimensioned compensation filter FIW.

For initial compensation, the distorted optical multiplexed signal $OSV_{1-N}$ is passed through a dispersion-compensating fiber DCF. However, the dispersion-compensating fiber cannot be produced to be precisely the inverse of the dispersion-causing characteristics of the transmission fiber. The nonlinear wavelength-dependent dispersion component still remains. This is compensated for via an appropriate inverse profile of the transfer function of the compensation filter FIW.

The period (FSR—free spectral range) of the dispersion compensation filter FIW covers a number of channels, preferably the channels of a WDM multiplexed signal. The complex transfer function of a filter must be optimized for optimum dispersion compensation. Both FIR (for example, transversal or lattice filters) and IIR filters (for example, filters with ring resonators), whose complex transfer functions/coefficients are adjusted, are suitable for this purpose.

The compensated optical WDM signal $OSK_{1-N}$ is split via an optical demultiplexer DMUX into individual signals (channels), which are converted in optoelectronic converters OEW and, after amplification in the receiver RX, are emitted as electrical data signals $DS_1$ to $DS_N$. The optimized transfer function is adjusted via open-loop control which, if possible, should be upgraded to closed-loop control.

In FIG. 5, the outputs of the wavelength-division demultiplexer DMUX are each followed by a correction filter KFI, in order to correct its nonideal transmission characteristics; in particular, its phase response. The correction filter may be an IIR (infinite impulse response) or FIR (finite impulse response) filter, whose complex transfer function is adjustable. Frequently, it is sufficient to compensate only for the phase response. The correction filter can be used wherever problems occur with undesirable filter characteristics. An open-loop or closed-loop controlled correction filter can react to changes in the filter and/or system parameters.

Figure 6:
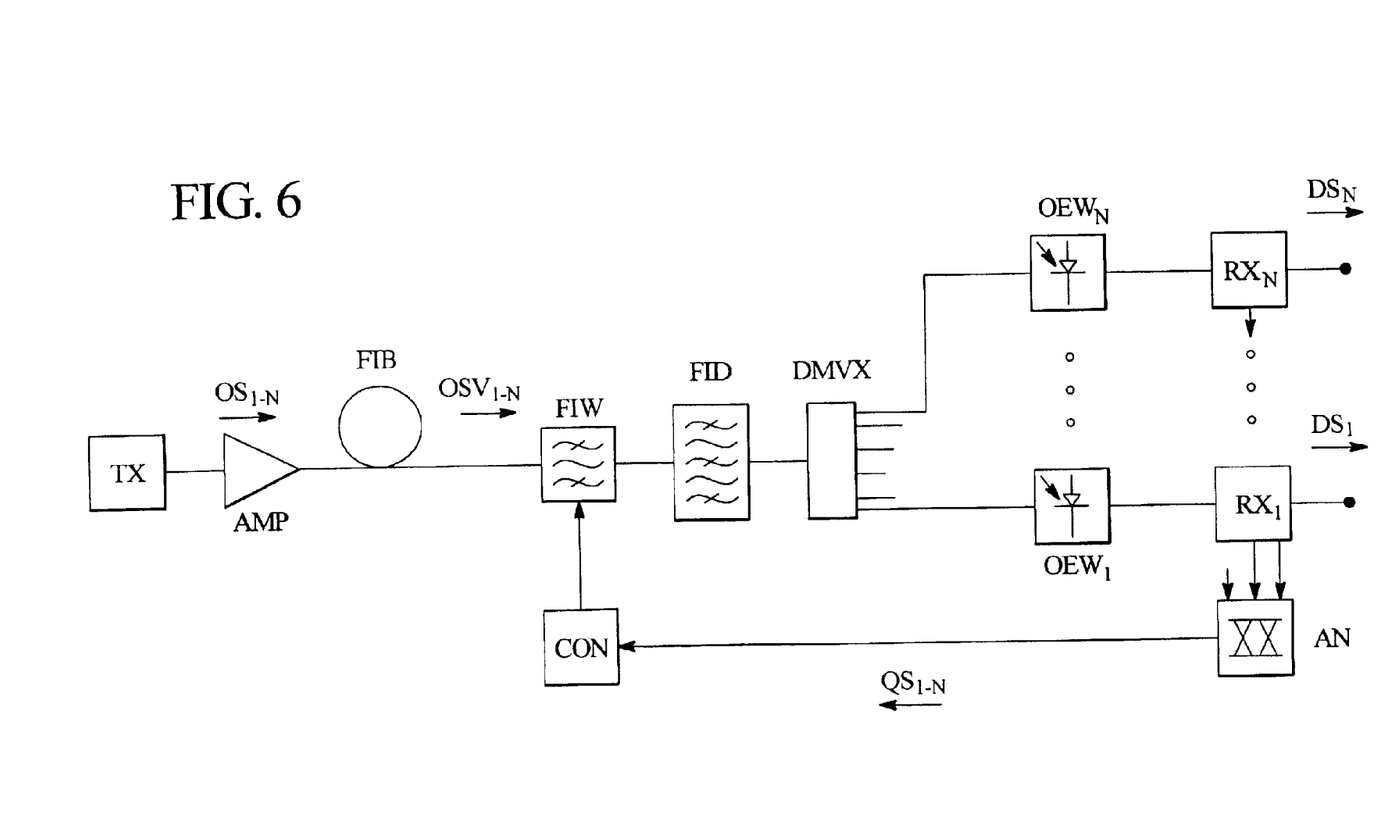
FIG. 6 shows an outline circuit diagram for adaptive dispersion compensation.

FIG. 6 shows an extended system which, in addition to the system known from FIG. 5, has a closed control loop for adjusting the dispersion compensation filter FIW. This includes an optical demultiplexer DMUX for splitting the multiplexed signal into individual signals, which are converted by optoelectrical converters $OEW_1$ to $OEW_N$ into electrical data signals $DS_1-DS_N$.

An analyzer AN (or a number of analyzers) assesses (or assess) the signal quality of the electrical (not limited) data signals $DS_1-DS_N$ of the transmission channels (for example in a chronological sequence) and emits a quality criterion $QS_{1-N}$ to an open-loop control device CON, which adjusts the filter coefficients on the basis of an optimization algorithm. Fundamental equalization is carried out either via the dispersion-compensating fiber DCF or via an appropriately dimensioned, a fixed adjustable, or a variably adjustable periodic optical filter FID, which is connected upstream of or downstream from the compensation filter FIW.

Figure 7:
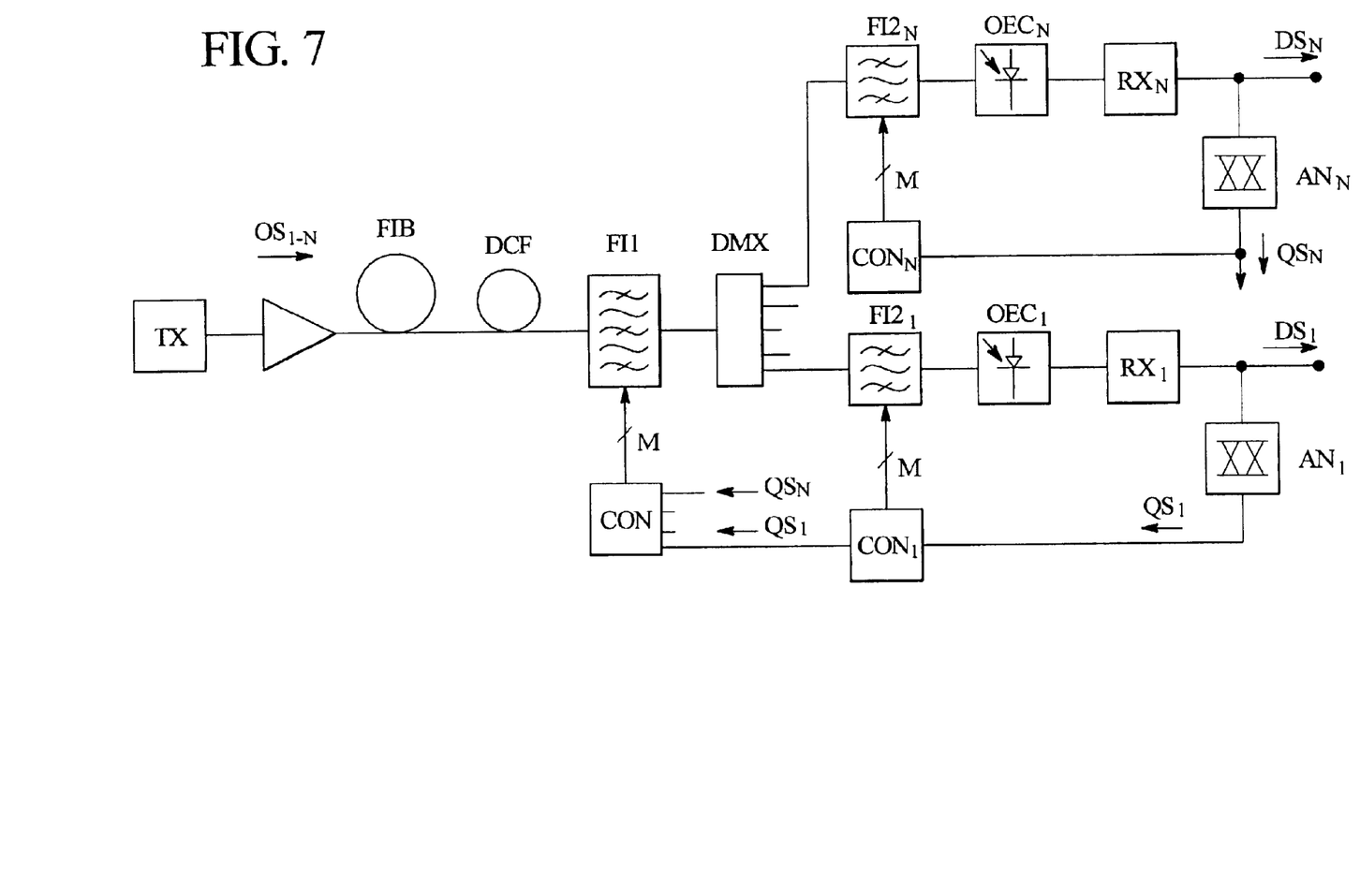
FIG. 7 shows an outline circuit diagram of a multistage compensation system.

FIG. 7 shows a compensation device for dispersion and PMD compensation for WDM signals, which contains a number of compensation systems, with a respective compensation filter FI1 and one of the filters $FI2_1-FI2_N$ being arranged functionally in series for each channel and being controlled by associated open-loop compensation control devices $CON2_1$ to $CON2_N$ and by a common open-loop dispersion control device CON.

A WDM signal $OS_{1-N}$ is once again transmitted as the optical signal. The filters are preceded by a dispersion-compensating fiber DCF for initial compensation, since the control range of the filters is limited. The initial compensation likewise can be carried out jointly for all the channels via a further periodic filter.

The initial compensation in the system is carried out via the dispersion-compensating fiber DCF jointly for all the channels. The wavelength-dependent remaining dispersion is compensated for in the adjustable dispersion compensation filter FI1, preferably a transversal filter, whose periodicity (FSR—free spectral range) preferably covers all the WDM channels in a transmission band.

The quality criteria $QS_1-QS_N$ (closed-loop control criteria) are derived from a number of channels, or from all of the channels, and are passed to the first open-loop control device CON1, which adjusts the coefficients of the first filter.

The dispersion compensation filter FI1 also may be a periodic filter, and may replace the dispersion-compensating fiber. In one variant, a filter 1, which is periodic with the channel interval, can be used for equalization in the presence of group delay time dispersion and/or self phase modulation compensation.

However, polarization mode dispersion should be compensated for channel-by-channel with a short time constant. The first compensation filter is therefore followed by an optical demultiplexer DEMUX, which separates the channels/individual signals in the WDM signal. The signals $DS_1-DS_N$ which are transmitted in the individual channels are compensated for as far as PDM is concerned separately in the second compensation filters $FI2_1$ to $FI2_N$, with the quality criteria $QS_1, \ldots, QS_N$ for each channel being determined in a separate analyzer $AN_1$ to $AN_N$. Different analyzers also may be used for dispersion compensation and for PMD compensation.

This compensation device also may be supplemented by further fixed setting or adaptive elements for compensation, by a further adaptive compensation filter, or by electrical filters. Equivalent optical PMD compensation may be carried out, especially in the case of linear optoelectrical conversion.

Although the present invention has been described with reference to specific embodiments, those of skill in the art will recognize that changes may be made thereto without departing from the spirit and scope of the present invention as set forth in the hereafter appended claims.

What is claimed is:

1. A compensation system for adaptive equalization of a distorted optical signal, comprising:
    an adjustable optical compensation filter to which the distorted optical signal is supplied and which emits a compensated optical signal; and
    an analyzer which determines signal quality and, via an open-loop control device, adjusts a transfer function of the optical compensation filter such that the signal quality is optimized, wherein the transfer function of the optical compensation filter is complex, and its real and imaginary components are adjusted.

2. A compensation system for adaptive equalization of a distorted optical signal as claimed in claim 1, further comprising:
    a polarization splitter, in order to compensate for polarization mode dispersion, for splitting the distorted optical signal into two stable orthogonal signal components;
    open-loop controlled optical PMD compensation filters to which are respectively supplied the orthogonal signal components; and
    a combiner, to which the orthogonal signal components of output signals from the PMD compensation filters are supplied, for combining the orthogonal signal components to form the compensated optical signal.

3. A compensation system for adaptive equalization of a distorted optical signal as claimed in claim 2, wherein one of a fixed adjustable filter, a fixed delay time element and an adjustable delay time element is inserted instead of one of the two adjustable PMD compensation filters.

4. A compensation system for adaptive equalization of a distorted optical signal as claimed in claim 1, further comprising an electrical filter connected downstream from the optical compensation filter.

5. A compensation system for adaptive equalization of a distorted optical signal as claimed in claim 1, wherein, for wavelength-dependent dispersion compensation for a wavelength-division multiplexed signal, a period of the optical dispersion compensation filter covers a plurality of transmission channels of a WDM signal, and its complex transfer function is an inverse of a dispersion profile of the transmission system.

6. A compensation system for adaptive equalization of a distorted optical signal as claimed in claim 1, wherein the optical compensation filter is a transversal filter with adjustable complex filter coefficients.

7. A compensation system for adaptive equalization of a distorted optical signal as claimed in claim 1, wherein the optical compensation filter includes a transversal filter and a recursive filter connected in series.

8. A compensation system for adaptive equalization of a distorted optical signal as claimed in claim 7, further comprising a further compensation element connected in series with one of the compensation filters.

9. A compensation system for adaptive equalization of a distorted optical signal as claimed in claim 8, further comprising, for fundamental compensation, one of a dispersion-compensating fiber and a further filter whose transfer function has a profile that is periodic at an interval of the transmission channels connected in series with the optical dispersion compensation filter.

10. A compensation system for adaptive equalization of a distorted optical signal as claimed in claim 1, further comprising a closed-loop control device for adaptive matching of the transfer function of the compensation filter.

11. A compensation system for adaptive equalization of a distorted optical signal as claimed in claim 10, further comprising:
   an optoelectrical converter, to which the compensated optical signal is supplied, for converting the compensated optical signal to an electrical data signal; and
   an analyzer connected downstream from the optoelectrical converter which receives and uses the electrical data signal to obtain a quality criterion which is used as a closed-loop control signal for adjusting the optical compensation filter.

12. A compensation system for adaptive equalization of a distorted optical signal as claimed in claim 11, wherein, when a wavelength-division multiplexed signal is transmitted, at least one analyzer assesses the signal quality in a plurality of transmission channels, and quality criterion obtained is used for adjusting the dispersion compensation filter.

13. A compensation system for adaptive equalization of a distorted optical signal as claimed in claim 1, further comprising an optical correction filter connected in series with filter components for providing a desired filter function, the optical correction filter having a complex transfer function which is used to correct signal distortion caused by components with a filter structure.

14. A compensation system for adaptive equalization of a distorted optical signal as claimed in claim 13, wherein the correction filter is an all-pass filter for correction of phase response.

15. A compensation system for adaptive equalization of a distorted optical signal as claimed in claim 13, wherein the correction filter has adjustable complex coefficients.

16. A compensation apparatus for compensating for distortion in a wavelength-division multiplexed signal, comprising:
   a first compensation system for dispersion compensation for the wavelength-division multiplexed signal, with a dispersion compensation filter in a first closed control loop;
   an optical demultiplexer, to which an output signal from the dispersion compensation filter is supplied, for splitting the wavelength-division multiplexed signal into individual signals; and
   a further adaptive compensation system, to which is supplied the individual signals, which is functionally connected in series and has an optical PMD compensation filter.

17. A compensation apparatus for compensating for distortion in a wavelength-division multiplexed signal as claimed in claim 16, wherein an optoelectrical converter and an adaptive electrical filter are inserted instead of the optical PMD compensation filters.

* * * * *